United States Patent
Ilic et al.

(10) Patent No.: US 10,812,327 B2
(45) Date of Patent: Oct. 20, 2020

(54) EVENT CLUSTERS

(71) Applicant: ENT. SERVICES DEVELOPMENT CORPORATION LP, Houston, TX (US)

(72) Inventors: Vladimir Ilic, Diegem (BE); Davor Brajanoski, Diegem (BE); Volker Messinger, Diegem (BE); Olivier Gomez, Grenoble (FR); Ricardo Sengenberger, Diegem (BE); Roman Orlov, Bratislava (SK); Albert Martinez, Sant Cugat del Valles (ES); Jaroslav Furka, Bratislava (SK); Marek Morvai, Bratislava (SK); Marek Horvath, Bratislava (SK); Peter Kluvanec, Bratislava (SK); Juraj Smetana, Bratislava (SK); Michael J. Brandon, Marietta, GA (US); Pablo Macaya, Sant Cugat del Valles (ES); Juan Jeronimo Cabello, Sant Cugat del Valles (ES)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 359 days.

(21) Appl. No.: 15/305,629

(22) PCT Filed: Jul. 31, 2014

(86) PCT No.: PCT/US2014/049082
§ 371 (c)(1),
(2) Date: Oct. 20, 2016

(87) PCT Pub. No.: WO2016/018348
PCT Pub. Date: Feb. 4, 2016

(65) Prior Publication Data
US 2017/0134226 A1    May 11, 2017

(51) Int. Cl.
*G06F 15/177*    (2006.01)
*H04L 12/24*    (2006.01)
(Continued)

(52) U.S. Cl.
CPC ........ *H04L 41/0816* (2013.01); *G06F 16/353* (2019.01); *H04L 41/082* (2013.01); *H04L 43/16* (2013.01)

(58) Field of Classification Search
CPC ... H04L 41/0816; H04L 41/082; H04L 43/16; H04L 41/0815; H04L 41/0823;
(Continued)

(56) References Cited

U.S. PATENT DOCUMENTS 5,321,837 A *   6/1994 Daniel .................... G06F 9/542
6,618,725 B1 *  9/2003 Fukuda ................ G06F 16/345
(Continued)

*Primary Examiner* — Thu Ha T Nguyen
(74) *Attorney, Agent, or Firm* — Sheppard Mullin Richter & Hampton LLP

(57) ABSTRACT

Event clusters can in an example embodiment include converting a description of an event associated with a configuration item (CI) to a standardized description, classifying the event based on a comparison of the standardized description of the event with a standardized description of a prior event included in an existing event cluster, and assigning the classified event to an event cluster.

17 Claims, 3 Drawing Sheets

(51) Int. Cl.
*G06F 16/35* (2019.01)
*H04L 12/26* (2006.01)

(58) Field of Classification Search
CPC ............. H04L 41/0813; H04L 41/0809; H04L 41/0806; G06F 16/353
USPC .................... 709/220, 221, 223, 224, 222
See application file for complete search history.

(56) References Cited

U.S. PATENT DOCUMENTS

| | | | |
|---|---|---|---|
| 6,910,135 B1* | 6/2005 | Grainger | G06F 21/316 709/202 |
| 6,986,076 B1* | 1/2006 | Smith | G06F 11/004 714/4.11 |
| 6,988,208 B2* | 1/2006 | Hrabik | H04L 63/1416 709/208 |
| 7,017,186 B2* | 3/2006 | Day | H04L 63/1408 709/224 |
| 7,263,464 B1* | 8/2007 | Dugger | H04L 41/0604 702/182 |
| 7,451,210 B2* | 11/2008 | Gupta | G06F 11/008 709/223 |
| 7,568,023 B2* | 7/2009 | Green | H04L 43/022 709/223 |
| 7,836,156 B1* | 11/2010 | Ou | H04L 41/12 709/220 |
| 7,844,687 B1* | 11/2010 | Gelvin | G06F 15/173 709/220 |
| 7,945,658 B1* | 5/2011 | Nucci | H04L 41/065 370/238 |
| 9,992,777 B2* | 6/2018 | Varghese | H04W 16/14 |
| 10,339,141 B2* | 7/2019 | Cafarella | G06F 16/24568 |
| 2004/0249650 A1* | 12/2004 | Freedman | G06Q 30/02 705/7.29 |
| 2006/0059253 A1* | 3/2006 | Goodman | G06Q 10/10 709/223 |
| 2006/0064716 A1* | 3/2006 | Sull | G06F 16/7857 725/37 |
| 2007/0266433 A1* | 11/2007 | Moore | G06F 21/53 726/15 |
| 2008/0155386 A1* | 6/2008 | Jensen | G06F 9/5083 715/201 |
| 2009/0172035 A1* | 7/2009 | Lessing | G06Q 30/02 |
| 2009/0254971 A1* | 10/2009 | Herz | G06Q 30/02 726/1 |
| 2009/0276383 A1* | 11/2009 | Salahshour | G06F 9/542 706/12 |
| 2010/0060436 A1* | 3/2010 | Kangas | G06F 11/0751 340/384.5 |
| 2010/0293048 A1* | 11/2010 | Singolda | G06Q 30/0244 705/14.43 |
| 2011/0185234 A1* | 7/2011 | Cohen | G06F 11/3476 714/37 |
| 2011/0206198 A1* | 8/2011 | Freedman | H04M 3/51 379/265.03 |
| 2011/0264485 A1* | 10/2011 | Notani | G06Q 10/087 705/7.31 |
| 2012/0069131 A1* | 3/2012 | Abelow | G06Q 10/067 348/14.01 |
| 2012/0290716 A1* | 11/2012 | Ogielski | H04L 41/00 709/224 |
| 2014/0075004 A1* | 3/2014 | Van Dusen | G06F 16/90335 709/223 |
| 2015/0281011 A1* | 10/2015 | Gates | H04L 41/065 709/224 |
| 2015/0341206 A1* | 11/2015 | Derakhshan | H04L 45/028 709/221 |
| 2016/0088501 A1* | 3/2016 | Venkataraman | H04L 41/5025 455/424 |
| 2016/0094401 A1* | 3/2016 | Anwar | H04L 41/142 709/223 |
| 2016/0197790 A1* | 7/2016 | Tsuchiya | H04L 41/14 709/224 |
| 2016/0210602 A1* | 7/2016 | Siddique | G06Q 30/0605 |
| 2017/0006135 A1* | 1/2017 | Siebel | G06F 8/10 |
| 2017/0295082 A1* | 10/2017 | Wu | H04L 43/14 |
| 2017/0359236 A1* | 12/2017 | Circlaeys | H04L 43/045 |
| 2018/0013773 A1* | 1/2018 | Valgenti | H04L 63/1416 |
| 2018/0018590 A1* | 1/2018 | Szeto | G06F 21/6254 |
| 2018/0025303 A1* | 1/2018 | Janz | G06Q 10/0639 705/2 |
| 2018/0121250 A1* | 5/2018 | Qi | H04L 43/026 |
| 2019/0130073 A1* | 5/2019 | Sun | G06K 9/6223 |
| 2019/0182101 A1* | 6/2019 | Kulshreshtha | H04L 41/0631 |
| 2019/0385057 A1* | 12/2019 | Litichever | H04L 63/1416 |
| 2020/0184278 A1* | 6/2020 | Zadeh | G06N 3/006 |

* cited by examiner

EVENT CLUSTERS

CLAIM FOR PRIORITY

The present application is a national stage filing under 35 U.S.C. § 371 of PCT application number PCT/US2014/049082, having an international filing date of Jul. 31, 2014, the disclosure of which is hereby incorporated by reference in its entirety.

BACKGROUND

Information technology (IT) can refer to the use of computing devices to manage information. IT management can include managing a variety of areas, such as computing devices, computer software, information systems, computer hardware, and processes related thereto. Issues in IT systems can cause reduced response times or even downtime in IT services.

DETAILED DESCRIPTION

Figure 1:
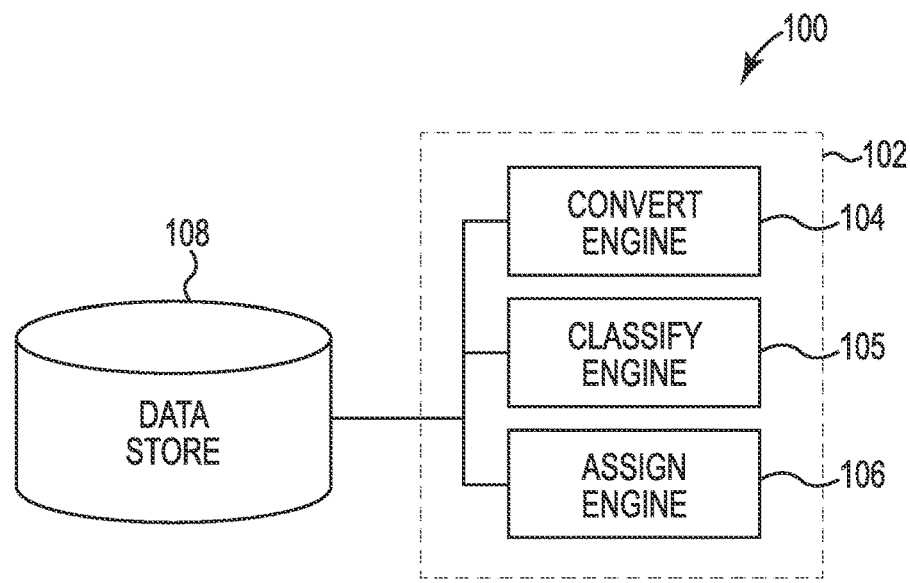
FIG. 1 illustrates a diagram of an example of a system for event clusters according to the present disclosure.

With increasing pressure on organizations to improve their performance, the organizations may seek to increase efficiencies related to Information technology (IT) systems. IT systems can include a plurality of configuration items (CI)s, for example, thousands of CIs. CIs, such as those described herein, can include, but are not limited to computing devices, computer software, information systems, computer hardware, and processes related thereto. When an event occurs with a CI it can affect other CIs of the IT system. For example, an event with a CI may cause that CI and/or other CIs to provide slower response times or may even cause downtime. Slower response times and/or downtime, along with other possible effects that an event with a CI may cause, are undesirable. Therefore, it is beneficial to resolve events with CIs quickly.

Some approaches attempting to resolve events with CIs may rely upon manual identification (e.g., identification by IT administrators and/or customers) of CIs and/or may be limited to known events (e.g., a previously encountered event). However, such approaches may be ineffective and/or time consuming, especially in the case of evolving IT systems (e.g., updated hardware and/or software) and/or events not previously encountered, among other difficulties.

In addition to the above described difficulties, as the number of CIs increases, so too does the complexity and/or time associated with resolving events. For example, a datacenter can have a plurality of servers (e.g., web servers, application servers, and/or a data server, among other servers) that can be, for instance, a thousand servers among other CIs of the datacenter. Resolving events for such a data center can be overly expensive (e.g., time-consuming) and/or difficult due to the changing nature of an environment (e.g., addition and/or removal of servers from the plurality of servers or shifting of the client demands) and/or the sheer size of the data center itself (e.g., due to a total number of the CIs included in the data center).

In contrast, examples of the present disclosure include methods, systems, and computer-readable media with executable instructions stored thereon for event clusters. Event clusters may be formed, for example, by converting a description of an event associated with a CI to a standardized description of the event, classifying the event based on a comparison of the standardized description of the event with a standardized description of a prior event included in an existing event cluster, and assigning the classified event to an event cluster. Event clusters can facilitate a reduction in a total number of events included in a work order and/or a reduction in a total number of work orders. In addition, a comparative reduction in a total number of events may be achieved through correlation, suppression, verification, and/or throttling of events, as described herein.

An event refers to a deviation from an expectation (e.g., failure to meet and/or maintain a performance metric specified by a service level agreement). Events can be automatically detected, for example, by, a number of servers operating as management servers and/or by a CI (e.g., a CI experiencing an event).

A CI refers to software, hardware, and/or network connections, for example, those associated with a business unit of a business organization. For instance, CIs can include nodes, databases and/or components included in a database, and processors, among other network connections. A CI, such as an application, can be stored in a database and/or installed on a server (e.g., coupled to a server and/or stored on integrated memory, such as a hard drive, of the server). For example, a CI can be included in a plurality of CIs associated with an enterprise data center including a database. Example databases include a central configuration management database (CMDB) and/or a universal configuration management database (uCMDB), among other databases. A uCMDB, for example, can store the plurality of CIs and/or information (e.g., event descriptions and/or event clusters, among other information) relating to the plurality of CIs.

FIG. 1 illustrates a diagram of an example of a system 100 for event clusters according to the present disclosure. The system 100 can include a data store 108 (e.g., analogous to data store 308 as referenced in FIG. 3), an event cluster system 102, and/or a number of engines. The event cluster system 102 can be in communication with the data store 108. The event cluster system 102 can include a number of engines (e.g., a convert engine 104, a classify engine 105, an assign engine 106, etc.). The event cluster system 102 can include additional or fewer engines than illustrated to perform the various functions described herein.

The number of engines can include a combination of hardware and programming to perform a number of functions described herein (e.g., a convert engine is to convert a description of an event associated with a CI to a standardized description of the event, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic).

A description of an event (i.e., an event description) refers to information associated with an event such as identifying information that can identify the event and/or a CI experiencing the event, among other information. An event description can be in electronic form (e.g., an email or otherwise electronically generated and/or conveyed). An event description can include, for example, a type of event (e.g., disk space low), identifying information associated with a CI experiencing an event (e.g., information such as a name, location, etc., that identifies a CI experiencing an event), and/or a time of occurrence of the event (e.g., when the CI began to experience the event), among other information.

In some examples, the description of the event can be provided in addition to (in an additional field in the same electronic transmission) identifying information associated with a CI experiencing an event. In such examples, identifying information can include information (e.g., numerical and/or special characters) that would otherwise be prohibited form inclusion in a standardized event description. For example, numerical identifying information (e.g., 484850), among other identifying information, can identify a particular CI of a plurality of CIs. In either case, identifying information can promote classifying, assigning (to event clusters), correlation, suppression, verification, and/or throttling of events.

An event description can be generated in response to an occurrence of an event, for example, automatically (e.g., without any human interaction) generated in response to occurrence of an event. For instance, a CI experiencing an event and/or a CI monitoring a CI experiencing an event can generate (e.g., automatically generate) a description of the event. Such generation results in association (e.g., identifying information identifying the CI experiencing the event being included in the event description) of an event description with the CI experiencing the event. In some examples, a CI monitoring a CI experiencing an event can be associated with an event.

Such information associated with an event may be generated in a variety of non-standard formats depending on a make/model of a CI experiencing an event, a type of the event of the CI (e.g., low disk space, output device not found, syntax error, etc.), a location of the CI, etc. Such varied message formats may be converted to a standard format, for example, to obtain standardized descriptions of various events.

A receive engine (not shown) can receive data indicating an occurrence of an event associated with a CI of a plurality of CIs. Such data can be received from a CI experiencing an event and/or a CI monitoring a CI experiencing an event.

The convert engine 104 is to convert a description of an event associated with a CI to a standardized description of the event in a standard format. A standard format refers to a use of particular information (e.g., alphabetic characters) and/or prohibition of inclusion of other types of information (e.g., prohibition of use of numeric characters and/or special characters) to convey information associated with an event. In some examples, a standard format includes only alphabetical characters. That is, in such an example, the standard format includes only nouns, adjectives, and/or verbs. The standard format does not include numerical characters (2, 30, 0.8, etc.). The standard format does not include special characters (%, $, *, #, !, @, (, ), [, ], /, ?, ., ,, <, &, +, −, etc.). That is, the standard format and a resultant standardized descriptions of events (converted from non-standard descriptions) using the same can include alphabetical characters, not special characters and/or numerical characters.

The standard format can include a predetermined number of white spaces between characters and/or words (e.g. nouns and/or verbs) included in a standardized description of an event. For example, a standardized description of an event can include a single white space before, between and/or following each respective character and/or word included in the standardized description of the event. However, the present disclosure is not so limited. That is, the position, presence, amount, location, etc. of white spaces in the standard format can be varied to promote event clusters, as described herein.

Example of a non-standard event descriptions include "disk space at 80%", "#syntax_error", "file titc not found". The convert engine 104 can convert such non-standard event description, for example, "disk space", "syntax error", file titc not found. Notably, the convert engine 104 can add and/or remove characters (e.g., numerical and/or special characters), entire words (e.g., "at"), and/or whitespaces to provide standardized descriptions of events, among other possibilities to promote event clusters.

The classify engine 105 is to classify an event based on a comparison of a standardized description of the event with a standardized description of a prior event included in an existing event cluster of a plurality of existing event clusters. That is, the classify engine 105 can classify a standardized description, such as a standardized description of an event received from the convert engine 104. For example, the classify engine 105 can classify a standardized description based on a degree of similarity to a standardized description of a prior event included in an existing event cluster of a plurality of existing event clusters. A degree of similarity can be a function of a total number of words included in an event description, a position of a word and/or other alphabetic characters in an event description, and/or be based on a distance between various characters and/or words included in an event description(s), among other ways to calculate a degree of similarity to promote event clusters.

For instance, the classify engine 105, in some examples, can classify an event description based on comparison of a total number of identical words included in identical respective positions within the standardized description of the event and the standardized description of a prior event. For example, an event having a standardized event description "disk space low" can be compared to an event cluster having a standardized description "disk low. In such an example, while a total number of words, three and two, respectively, is different, the occurrence of "disk" as the first word in both of the standardized descriptions and/or the occurrence of "low" in both the standardized descriptions may result in a comparatively higher degree of similarity when contrasted with an event cluster having an event description that does not have one or both of the above elements.

Calculating distance between words in standardized event descriptions can include calculating a cosine distance between words and/or characters. In some implementations, a total number of same characters and/or words at an identical position within a respective event descriptions can calculated by calculation of a cosine distance between two words (e.g., a number of the same characters at identical positions in the two words) divided by a square root of a multiple lengths of the two words; for example a cosine distance can be calculated pseudocode that represents instructions executable to calculate a cosine distance in accordance with a number of embodiments of the present disclosure as detailed below:

CalculateCosineDistance(string a, string b):
    string [ ]WordsinCluster;

-continued

```
          string [ ]WordsinEvent;
          int 1 = WordsinEvent.Length;
          int I2 = WordsinCluster.Length;
             int commonWords = 0;
                int minlength;
                  if (I1 < I2)
                 minlength = I1;
                     else
                 minLength = I2;
        for (intj = 0;j < minLength;j + +);
                      {if
        (WordsinEvent[j].Equal(WordsinCluster(j))));
                commonWords + +;);
                   DoubleCdist;
        cDist = comonWords/ System.Math.Sqrt(I1 * I2);
                  return Dist;}.
```

A comparatively higher distance (e.g., a higher cosine distance) translates to a higher degree of similarity between a standardized description of an event and a standardized description of a prior event included in an existing event cluster. For example, identical event descriptions have a cosine distance equal to one. Classification, whether based on a total number of words included in as event description, a position of a word and/or other alphabetic characters in an event description, and/or be based on a distance between various characters and/or words included in an event description(s) can result in assignment of an event to an event cluster that has a comparatively highest degree of similarity, as described herein.

Notably, each event assigned to an event cluster may or may not have the same degree of similarity to other respective events in the cluster. For example, an event cluster can include a plurality of events such as a first event having a degree of similarity to another event in the cluster of 0.9 and a second event in the cluster having a degree of similarity to the another event in the cluster of 1.0 (e.g., having identical standardized descriptions). Put another way, in some examples, a plurality of events having different degrees of similarity (e.g., different respective degrees of similarity to a given event description included in the event cluster) can be assigned to the same event cluster. In this manner, a comparatively great number of events, for example, those satisfying a similarity threshold, can be assigned to an event cluster and/or a work order than other approaches that may require the events to be identical (e.g., including only those with identical descriptions) in a grouping of events. Effectively, this can reduce a total number of work orders, among other advantages.

An assign engine 106 can assign a classified event, such as those classified by the classify engine 105, to an event cluster. An event cluster refers to a number of events that have standardized event descriptions that are similar, for example, those having a degree of similarly that satisfies a similarity threshold. Events in an event cluster can share a cause (e.g., a root cause) of an event; however, sharing a cause is not a requirement for inclusion of events in an event cluster. A cause can be identified by the classify engine 105 or otherwise identified. For instance, a cause may correspond to a particular character(s) included in standardized description of an event. For example, a particular word, words, and/or combination of words (e.g., an order of appearance from left to right within a standardized description) can be identified as an cause that alone or in combination with another cause the event to occur. A cause can be verified and/or undergo remediation. For instance, remediation of a root cause (e.g., a rack of a server) can include repairing the root cause (e.g., a CI) and/or replacement of the root cause (e.g., with a similar CI) so service and/or a desired level of service can be resumed.

The assign engine 106 can assign an event (e.g., a classified event) to an event cluster based on similarity of an event to an event cluster. For instance, a determine engine (not shown) can determine that a degree of similarity satisfies a similarity threshold (e.g., a numerical value such as 0.8) or that a degree of similarity does not satisfy a similarity threshold. A degree of similarity can be calculated by as a function of a number of identical words in the same, among other possibilities.

For example, the assign engine 106 can compare an event to a plurality of existing event clusters and assign the event to an existing event cluster of the plurality of existing event clusters that exhibits a comparatively greatest degree of similarity to the event. However, the present disclosure is not limited to assignment of an event to existing event clusters. Rather, the assign engine 106 can assign an event to a new event cluster. Assignment to a new event cluster can occur in response to determining that an event does not satisfy (e.g., does not meet or exceed) a similarity threshold with regard to a plurality of existing event clusters.

Figure 2:
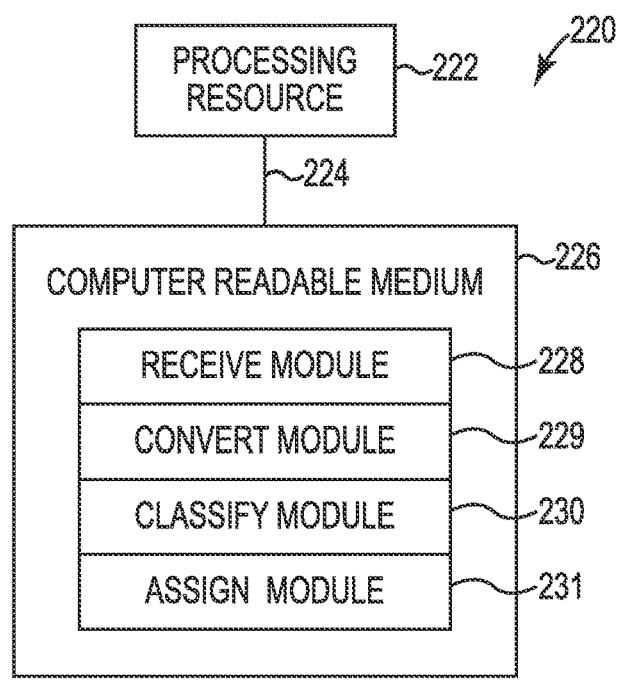
FIG. 2 illustrates a diagram of an example computing device according to the present disclosure.

FIG. 2 illustrates a diagram of an example of a computing device for event clusters according to the present disclosure. The computing device 220 can utilize software, hardware, firmware, and/or logic to perform a number of functions described herein.

For example, the computing device 220 can be a combination of hardware and instructions for event clusters. The hardware, for example can include a processing resource 222 and/or a memory resource 226 (e.g., computer-readable medium (CRM), data store, etc.) A processing resource 222, as used herein, can include a number of processors capable of executing instructions stored by a memory resource 226. Processing resource 222 can be integrated in a single device or distributed across multiple devices (e.g., multiple servers). The instructions (e.g., computer-readable instructions (CRI)) can include instructions stored on the memory resource 226 and executable by the processing resource 222 to implement a desired function (e.g., converting a description of an event associated with a CI of a plurality of CIs to a standardized description of the event, etc.).

The memory resource 226 can be in communication with a processing resource 222. A memory resource 226, as used herein, can include a number of memory components capable of storing instructions that can be executed by processing resource 222. Such memory resource 226 can be a non-transitory CRM. Memory resource 226 can be integrated in a single device or distributed across multiple devices. Further, memory resource 226 can be fully or partially integrated in the same device as processing resource 222 or it can be separate but accessible to that device and processing resource 222. Thus, it is noted that the computing device 220 can be implemented on a client device, a collection of client device, a support device, a collection of support devices, and/or on a combination of the client devices and support devices.

The memory resource 226 can be in communication with the processing resource 222 via a communication link (e.g., path) 224. The communication link 224 can be local or remote to a computing device associated with the processing resource 222. Examples of a local communication link 224 can include an electronic bus internal to a computing device where the memory resource 226 is one of volatile, nonvolatile, fixed, and/or removable storage medium in communication with the processing resource 222 via the electronic bus.

The memory resource 226 can include a number of modules such as a receive module 228, a convert module 229, a classify module 230, an assign module 231, etc. The number of modules 228, 229, 230, 231 can include CRI that when executed by the processing resource 222 can perform a number of functions. The number of modules 228, 229, 230, 231 can be sub-modules of other modules. For example, the receive module 228 and the convert module 229 can be sub-modules and/or contained within the same computing device. In another example, the number of modules 228, 229, 230, 231 can comprise individual modules at separate and distinct locations (e.g., CRM, etc.).

Each of the number of modules 228, 229, 230, 231 can include instructions that when executed by the processing resource 222 can function as a corresponding engine, including those as described herein. For example, the receive module 228 can include instructions that when executed by the processing resource 222 can function as a receive engine (not shown), for instance, to receive data indicating an occurrence of an event associated with a CI of a plurality of CIs. Similarly, a convert module 229 can function as the convert engine 104 to convert a description of an event associated with a CI to a standardized description of the event in standard format.

In some examples, the receive module 228 can include instructions that when executed by the processing resource 222 can automatically (e.g., without human inputs such as those from an information technology administrator) receive the data in response to occurrence of an event. Again, such data can be received from a CI experiencing an event, a CI monitoring a CI experiencing an event, and/or otherwise provided to the receive module 228. In some examples, receive module 228 can elevate (e.g., escalate) an event based on a type of event and/or a particular CI experiencing an event, among other reasons for elevating a CI. Elevation refers to notification of personal associated with fulfillment of a work order. For example, an event can be elevated, to a development team, when it is associated with a CI in development such that the development team can remediate the event (e.g., an event can be elevated as an incident notification and/or work order to the development team). Events that are not elevated are automatically remediated (e.g., without human interaction).

In some examples, an event, an event cluster, and/or a plurality of events in an existing event cluster can be elevated based on a total number of occurrences of the same event. That is, an event can be correlated, through various ways including those described herein, with an existing event cluster and/or a plurality of events in an existing event cluster. Such a correlated event can be elevated (e.g., elevation to a senior information technology support member, etc.) when an event is correlated to a plurality of events having a total number of occurrences (e.g., a number of prior events plus the event) that exceeds an occurrence threshold (e.g., five occurrences).

Correlation, suppression, verification (e.g., proof of persistence), and/or throttling of events can reduce a total number of event clusters and/or reduce work orders, among other advantages. Correlation of an event with a prior event (such as those in an existing event cluster) can be a function of a time of occurrence of an event, a location of CI experiencing an event (e.g., a particular customer location), a CI associated with an event, among other factors. Examples of correlation include correlation of "up" and "down" events, correlation of events experienced by a particular CI, correlation of events that reoccur from a particular CI periodically, correlation of events experienced during a particular time period, and/or correlation of events with a same or substantially similar cause, among other possibilities.

Correlation of an "up" event with a "down" event can include correlation of an "up" event including an event description that conveys a CI is "up" (e.g., functioning as intended) with a prior "down" event including an event description that conveys the CI was "down" (e.g., not functioning as intended). For example, an "up" event that is correlated with a "down" event can result in only one of the events, the "down" event", being elevated, as described herein. Examples of "up" and "down" events can include transitory events and/or those that can be resolved automatically by a CI experiencing an event and/or a CI monitoring the CI experiencing an event, among other possible events.

Correlation of events experienced by a particular CI can be time based or time-independent. For example, events associated with a particular CI occurring during a particular time period (e.g., 1 hour) can be correlated. In some examples, events associated with a particular CI can be correlated regardless of time (e.g., a time of occurrence of an event and/or a prior event).

In some examples, events occurring during a particular time period can be correlated. Such time based correlation can be independent of a CI associated with an event. For example, all events occurring during a time period (e.g., 1 hour) can be correlated (e.g., an event associated with a CI can be correlated with an event associated with another CI when the events occur in a given time period).

Correlation can include correlating events with a same or similar cause (e.g., a root cause). Again, a cause can be cause may correspond to a particular character(s) included in standardized description of an event, among other possibilities. In some examples, events at a particular location (e.g., a customer location) can be correlated with or without regard to a time of occurrences of events.

Suppression refers to suppressing events are associated with an existing work order. For instance, an event can be suppressed when a prior event and the event share a cause. That is, the event and the prior event have been generated (e.g., generated and elevated) for the same cause. For example, if a CI is undergoing remediation but not yet remediated it may continue to experience events. Such events may be of limited or no value in terms of adding to an event cluster and/or work order due to a work order already existing for the CI. As such, events that are associated with an existing work order can be suppressed (e.g., not elevated).

Verification refers to verifying that events cause operation interruption (e.g., cause a CI to function other than as intended). Events that are verified can be classified and/or elevated. Events that are not verifiable can be dismissed (e.g., not classified and/or elevated). Examples of such events that can be dismissed include transitory events, for example, events resolved automatically by a CI experiencing the event and/or a CI monitoring the CI experiencing the event within an anticipated and/or acceptable time period. For example, a CI experiencing an event can perform a reset and/or restart. When periodic automatic monitoring of the CI reveals that such a reset/restart remedies the event (e.g., the CI functions as intended) than the event can be dismissed. Conversely, when the event is not remedied in such an examples then the event can be classified, assigned, and/or added to a work order (e.g., a new work order or an existing work order).

Throttling refers to creating a work order threshold on a total number of work orders that can be generated (e.g., automatically generated) during a given period of time. For example, a given CI and or grouping of related CIs may under some circumstances may experience a large number of events. However, a particular cause and/or a few causes can be responsible for the large number of events. Thus, one a work order and/or work orders for the cause and/or a few causes are generated additional work orders directed to the same causes may be of little or no value from an operational standpoint, etc. In some circumstances, it may be difficult (time consuming, costly, etc.) to accurately determine when a work order has been generated for each cause of an event(s). Therefore, throttling can advantageously limited a total number of work orders that can be generated (e.g., automatically generated) during a given period of time (e.g., 1 hour). However, it is noted that each event cluster can be issued a work order upon generation of the event cluster and/or upon reaching a specified total number of events included in the event cluster, and/or when permitted by throttling, among other possibilities.

A convert module 229 can include instructions that when executed by the processing resource 222 can convert a description of the event included in the received data to a standardized description of the event in standard format. For example, the convert module 229 can convert a description of the event to a standardized description that does not include prohibited characters such as special characters and/or numeric characters.

The classify module 230 can include instructions that when executed by the processing resource 222 can classify an event, such as the event converted by convert module 229, based comparison of the standardized description of the event with a standardized description of a prior event included in an existing event cluster of a plurality of existing event clusters. In some examples, the classify module 230 can classify the event based on comparison of a total number of words included in the standardized description of the event and a total number of words included in the standardized description of a prior event. For example, when a total number of words in the standardized event description (e.g., 3 words) is equal to a total number of words (e.g., 3 words) in an standardized description of a prior event included in an existing event cluster than the event can be classified as satisfying a degree of similarity with the prior event and/or the existing event cluster. Conversely, when a total number of words in the standardized event description (e.g., 3 words) is different than a total number of words (e.g., 5 words) in an standardized description of a prior event included in an existing event cluster than the event can be classified as not satisfying a degree of similarity with the prior event and/or the existing event cluster.

The assign module 231 can include instructions that when executed by the processing resource 222 can assigns the classified event to an event cluster. For instance, the assign module 231 can assign the event to an existing event cluster or a new event cluster, as described herein. In some examples, the event can be assigned to an existing event cluster when the event has a degree of similarity to the prior event that satisfies a similarity threshold. Assign module 231 can assign the event to a new event cluster when the event has a degree of similarity to the prior event that does not satisfy a similarity threshold.

Figure 3:
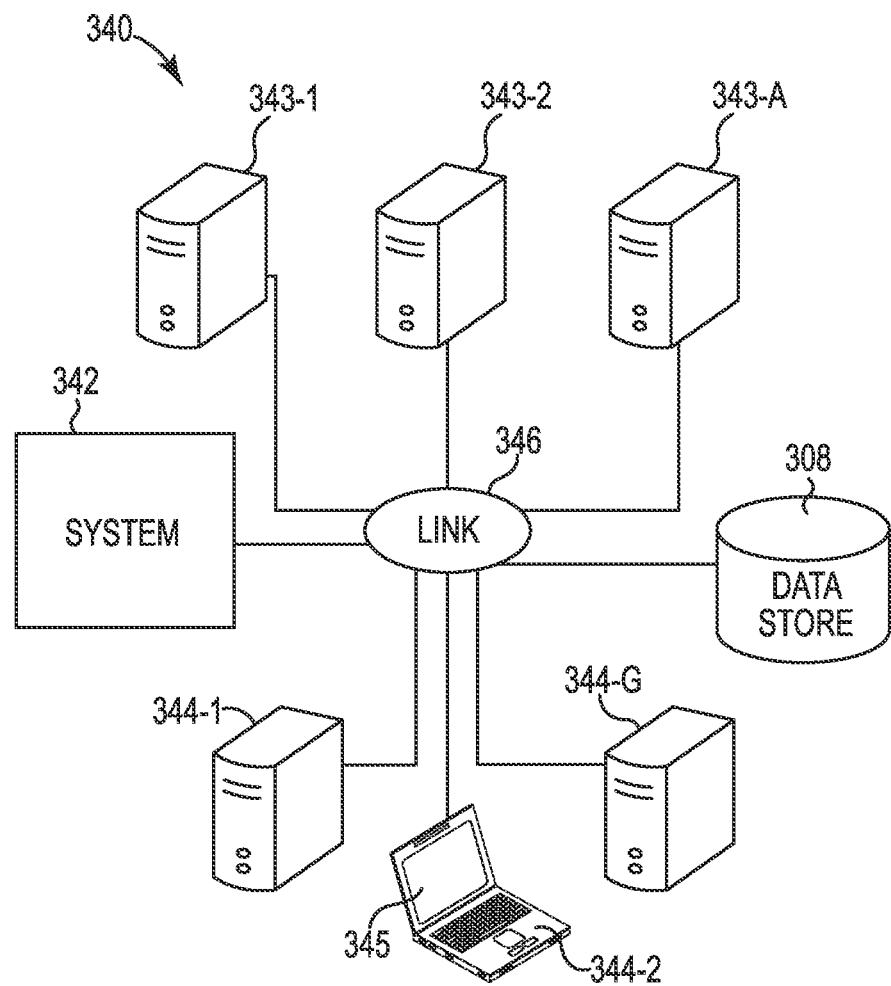
FIG. 3 illustrates an example of an environment in which various example processes can be implemented for event clusters according to the present disclosure.

FIG. 3 illustrates an example of an environment 340 in which various example processes can be implemented for event clusters according to the present disclosure. The environment 340 is shown to include a system 342 for event clusters, support devices 343-1, 343-2, . . . , 343-A, client devices 344-1, 344-2, . . . , 344-G, a data store 308, and a link 346.

The system 342 for event clusters can represent different combinations of hardware or hardware and instructions to event clusters. The system 342 for event clusters can include a computing device (not shown), for instance, computing device 220 as discussed with respect to FIG. 2. The system 342 can include engines analogous to engines described with respect to FIG. 1. For example, the system 342 can include a convert engine, classify assign engine, an assign engine, as described herein with respect to FIG. 1, among other engines.

Event descriptions, event clusters, among other information, can be viewed using a support device, such as support devices 343-1, . . . , 343-A. Support devices 343-1, . . . , 343-A represent devices that can generate/receive electronic data having browsers and/or other applications to communicate such data and/or facilitate viewing of event clusters and/or work orders, among other abilities. Examples of support devices 343-1, . . . , 343-A include desktop/laptop computers, mobile phones, and/or servers, among other devices suitable for event clusters. Similarly, examples of client devices 344-1, . . . , 344-G can include desktop/laptop computers, mobile phones, and/or servers, among other devices suitable for event clusters.

In various examples, the support devices 343-1, . . . , 343-A and/or data store(s) 308 can be separate and distinct from the client devices 344-1, . . . , 344-G. As described herein, being separate and distinct refers to an environment being physically separate and/or having separate network resources with respect to each other. In this manner, a support device can receive (e.g., remotely receive) a work order and/or other information from a client device. However, the present disclosure is not so limited. That is, the support devices, data store(s), and client devices can be at the same location (e.g., included in a common building and/or organization). Regardless, receipt of information (e.g., a classified event, an event cluster, and/or a work order) from the client devices 344-1, . . . , 344-G by the support devices 343-1, . . . , 343-A can promote event clusters, as described herein.

The support devices 343-1, . . . , 343-A and/or the client devices 344-1, . . . , 344-G can include an electronic display such as a GUI 345. A user interface (UI) can include hardware components and/or computer-readable instruction components. For instance, hardware components can include input components (e.g., a mouse, a touch screen, and a keyboard) and/or output components (e.g., a display). An example UI can include a GUI. A GUI can, for example, electronically
displaying an indication representing a degree of similarity between a standardized description of an event and a description of a prior event, among other electronic representations.

Link 346 (e.g., a network) represents a cable, wireless, fiber optic, and/or remote connection via a telecommunication link, an infrared link, a radio frequency link, and/or other connectors or systems that provide electronic communication. That is, the link 346 can, for example, include a link to an intranet, the Internet, or a combination of both, among other communication interfaces. The link 346 can also include intermediate proxies, for example, an intermediate proxy server, routers, switches, load balancers, and the like. However, the present disclosure is not so limited. That is, link 346 can represent a physical connection between the support devices 343-1, . . . , 343-A and the client devices 344-1, . . . , 344-G to communicate instructions between the client devices 344-1, . . . , 344-G, the support devices 343-1, . . . , 343-A, and/or the data store 308.

Figure 4:
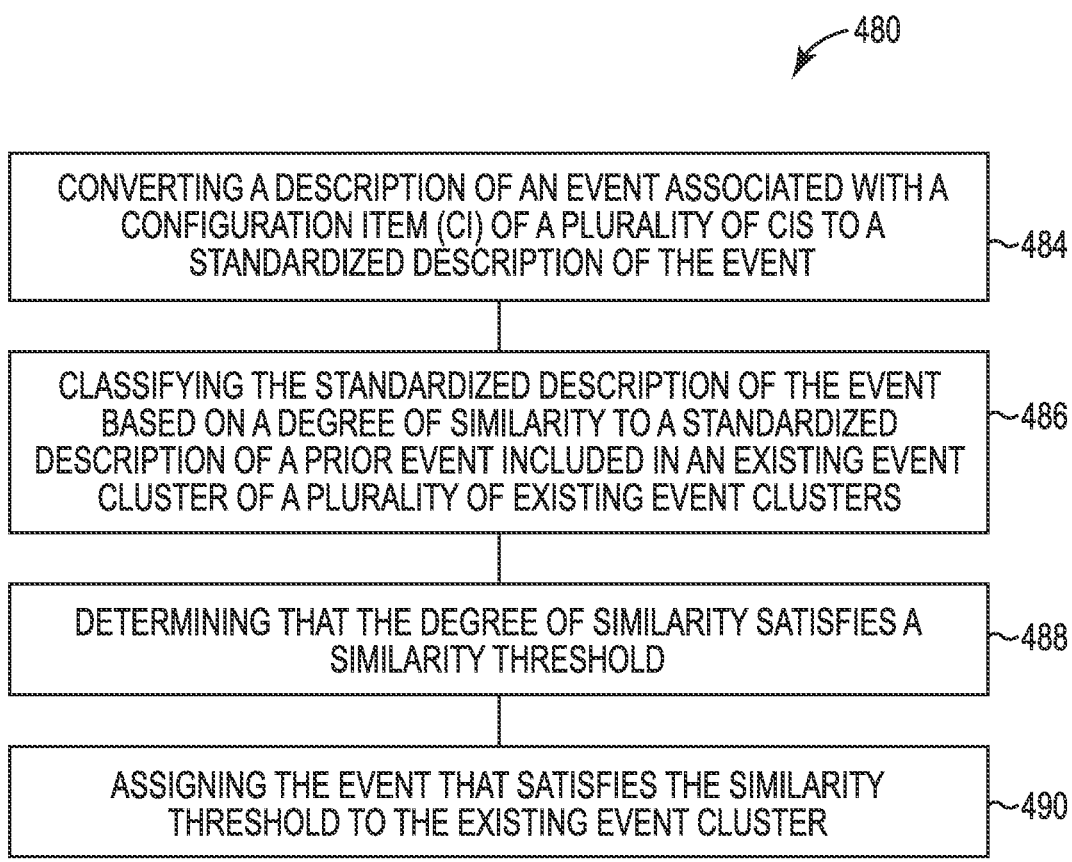
FIG. 4 illustrates a flow diagram of an example of a method for event clusters according to the present disclosure.

FIG. 4 illustrates a flow diagram of an example of a method for event clusters according to the present disclosure. As shown at 484, in various examples, the method 480 can include converting a description of an event associated with a CI of a plurality of CIs to a standardized description of the event, as described herein.

The method 480 can include, classifying the standardized description of the event based on a degree of similarity, as described herein, to a standardized description of a prior event included in an existing event cluster of a plurality of existing event clusters, as shown at 486. In some examples, the prior event is included in a plurality of prior events included in respective existing event clusters. In such an example, classifying the event can be based a degree of similarity to respective standardized descriptions of each of the plurality of prior events. Classifying based on a degree of similarity to respective standardized descriptions of each of the plurality of prior events can promote assignment of the event to an event cluster including a prior event with an event description that has a comparatively highest degree of similarity to the description of the event and/or enable determination that a degree of similarity does not satisfy a similarity threshold (e.g., such that a new event cluster and/or new work order is generated for the event).

As shown at 488, the method 480 can include determining that the degree of similarity satisfies a similarity threshold (e.g., meets or exceeds a numerical values set as a similarity threshold). The method 480 can include assigning the event that satisfies the similarity threshold to the existing event cluster, as shown at 490. In some examples, the method 480 can include assigning the event to a work order associated with the existing event cluster. For instance, assignment of an event to an existing work order associated with the existing event cluster and/or the existing event cluster can include adding information associated with the event to the work order and/or existing event cluster and/or incrementing a total number of events included in the work order (e.g., increasing a total number of events in the work order by "1") and/or existing event cluster to account for and/or memorialize the addition of the event to the existing work order and/or the existing event cluster. Notably, an existing event cluster may or may not have an existing work order. For instance, correlation of an event with prior event(s) may be conducted prior to creating a work order for the event. In this manner, a total number of work orders can be comparatively reduced compared to approaches that do not conduct correlation of events.

In some examples, the method can include including displaying an indication of the degree of similarity. For example, an indication of a degree of similarity can be visually displayed via a GUI of a support device. Similarly, work orders, among other information can be displayed by a support device. Displaying, for example, can include causing a display in response to receipt of a classified event and/or in various other manners to display information to promote event clusters. An indication can be displayed and/or communicated to a support device and/or other device in a manner suitable to promote monitoring of a total number of event clusters, a status of each work order (e.g., remediation completed, remediation on-going, remediation not yet scheduled, etc.) of a plurality of work orders, a total number of work orders at a given time (e.g., 400 completed work orders, 17 on-going work orders, 2 work orders not yet scheduled), and/or a degree of similarity to each of the event clusters, among other information. Remediation can refer to repair and/or replacement of a CI such that the CI functions as intended. Remediation can be automatic. Remediation can be based upon a runbook and/or other predetermined rules and responses to events.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system, having computer-readable instructions stored on non-transitory computer-readable media and executable by a processor, comprising a convert engine, a classify engine, and an assign engine, wherein:

the convert engine is to convert a description of an event associated with a configuration item (CI) to a standardized description of the event by at least removing characters including numerical and special characters, wherein the standardized description of the event includes only alphabetical characters;

the classify engine is to classify the event based on a comparison of the standardized description of the event with a standardized description of a prior event included in an existing event cluster of a plurality of existing event clusters; and the assign engine is to assign the classified event to an event cluster, wherein the assign engine is to assign the event to the existing event cluster when a degree of similarity between the event and the prior event satisfies a similarity threshold, and wherein the degree of similarity between the event and the prior event is a function of at least one of: total numbers of words and characters, positions of words and characters, or distances between words and characters in standardized descriptions of the event and the prior event.

2. The system of claim 1, wherein the classify engine is to classify the event based on comparison of a total number of identical words included in identical respective positions within the standardized description of the event and the standardized description of the prior event.

3. The system of claim 1, wherein the assign engine is to assign the event to a new event cluster when the event has a degree of similarity to the prior event that does not satisfy a similarity threshold.

4. A non-transitory computer readable medium storing instructions executable by a processing resource to cause a device to perform:
   receiving data indicating an occurrence of an event associated with a configuration item (CI) of a plurality of CIs;
   converting a description of the event included in the received data to a standardized description of the event in a standard format by at least removing characters including numerical and special characters, wherein the standardized description includes only alphabetical characters;
   classifying the event based on a comparison of the standardized description of the event with a standardized description of a prior event included in an existing event cluster of a plurality of existing event clusters; and
   assigning the classified event to an event cluster,
      wherein the assigning comprises assigning the event to the existing event cluster when a degree of similarity between the event and the prior event satisfies a similarity threshold, and
      wherein the degree of similarity between the event and the prior event is a function of at least one of: total numbers of words and characters, positions of words and characters, or distances between words and characters in standardized descriptions of the event and the prior event.

5. The medium of claim 4, wherein the data is automatically received in response to an occurrence of the event.

6. The medium of claim 4, wherein the event is classified based on comparison of a total number of words included in the standardized description of the event and a total number of words included in the standardized description of the prior event.

7. The medium of claim 4, wherein the event is elevated when it is associated with a CI in development.

8. The medium of claim 4, wherein the event is correlated to a plurality of prior events and elevated when a total number of occurrences of the plurality of prior events exceeds an occurrence threshold.

9. The medium of claim 4, including instructions to suppress generation of an event when the prior event and the event share a cause.

10. A method, stored as computer-readable instructions on non-transitory computer-readable media and executable by a processor, the method comprising:
    converting a description of an event associated with a configuration item (CI) of a plurality of CIs to a standardized description of the event,
       wherein the converting comprises removing characters including numerical and special characters, and
       wherein the standardized description of the event includes only alphabetical characters;
    classifying the standardized description of the event based on a comparison of the standardized description of the event with a standardized description of a prior event included in an existing event cluster of a plurality of existing event clusters;
    determining that a degree of similarity between the event and the prior event satisfies a similarity threshold,
       wherein the degree of similarity between the event and the prior event is a function of at least one of: total numbers of words and characters, positions of words and characters, or distances between words and characters in standardized descriptions of the event and the prior event; and
    assigning the event to the existing event cluster.

11. The method of claim 10, wherein classifying includes classifying based on a degree of similarity to respective standardized descriptions of each of a plurality of prior events included in respective existing event clusters.

12. The method of claim 10, including assigning the event to a work order associated with the existing event cluster.

13. The method of claim 10, including displaying an indication of the degree of similarity to the standardized description of the prior event.

14. The method of claim 10, wherein the distance is a cosine distance.

15. The method of claim 10, wherein the event is elevated when it is associated with a CI in development.

16. The method of claim 10, wherein the event is correlated to a plurality of prior events and elevated when a total number of occurrences of the plurality of prior events exceeds an occurrence threshold.

17. The method of claim 10, further comprises suppressing generation of an event when the prior event and the event share a cause.

* * * * *